May 12, 1931. J. W. WOODRUFF 1,804,449

HIGH PRESSURE LUBRICATING APPARATUS

Filed June 15, 1929 4 Sheets-Sheet 2

INVENTOR
Joseph H. Woodruff,
BY
Everett Cook,
ATTORNEYS.

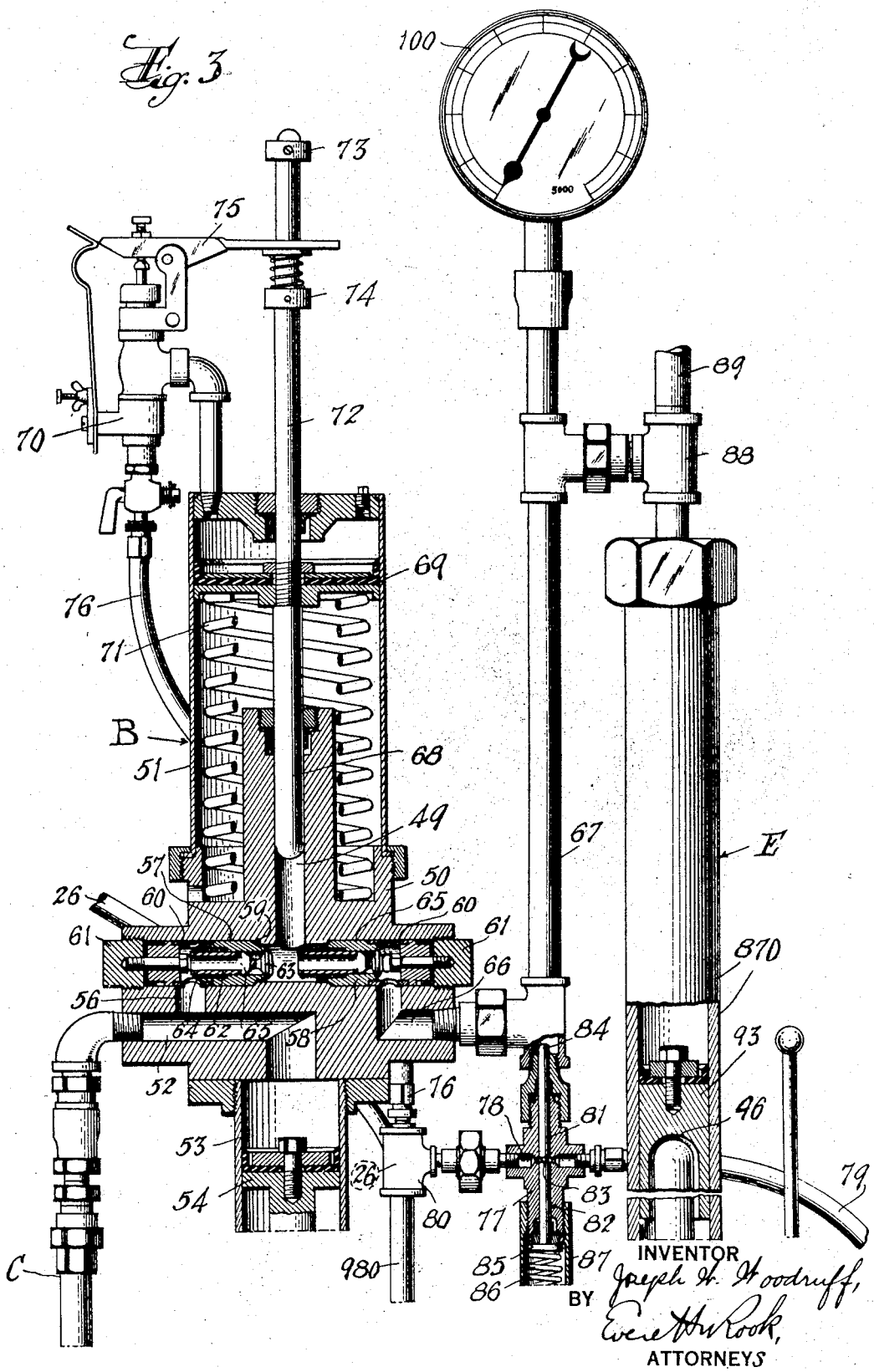

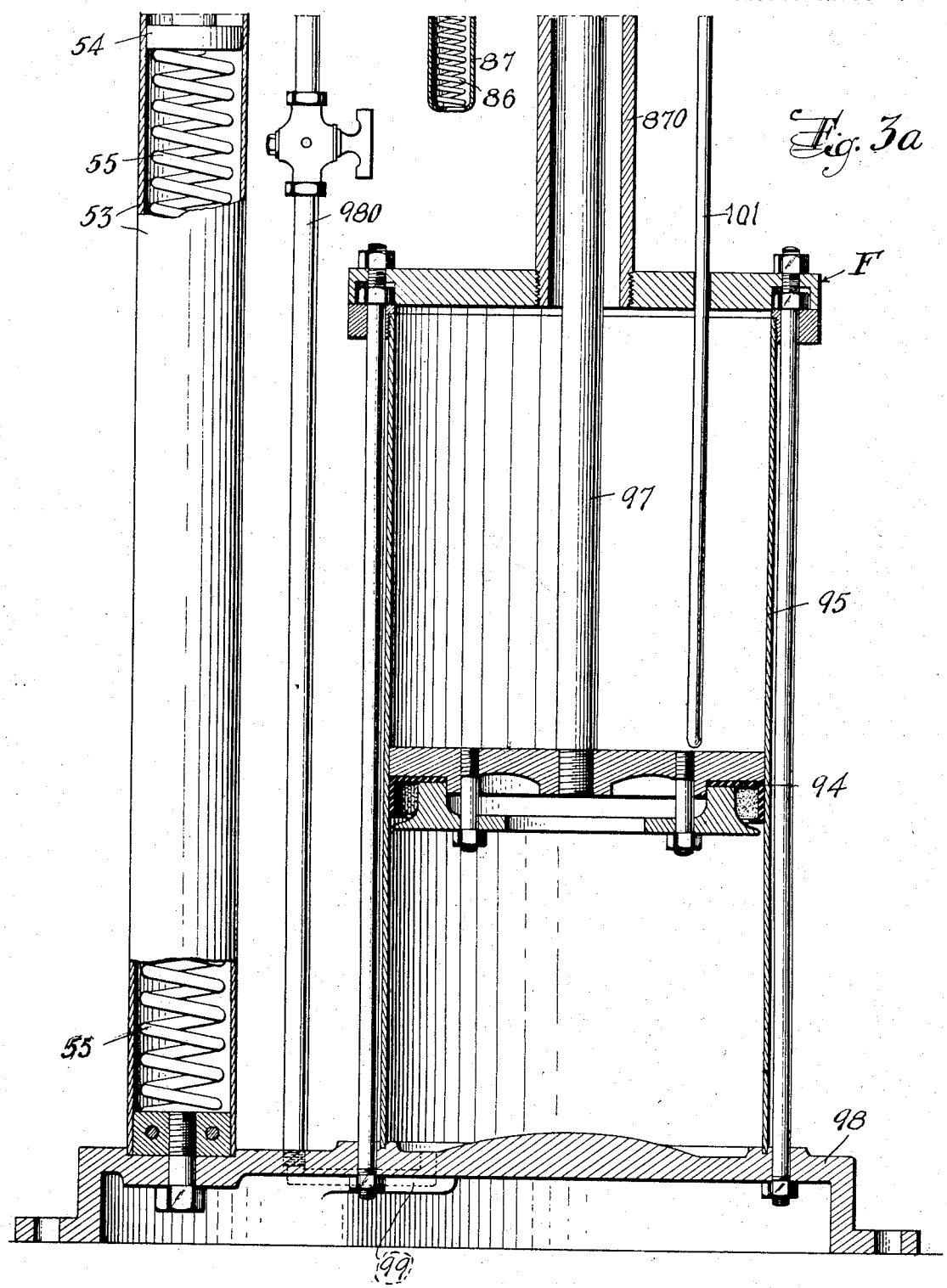

Patented May 12, 1931

1,804,449

UNITED STATES PATENT OFFICE

JOSEPH W. WOODRUFF, OF ELIZABETH, NEW JERSEY

HIGH PRESSURE LUBRICATING APPARATUS

Application filed June 15, 1929. Serial No. 371,110.

This invention relates in general to apparatus for pumping liquids or semi-liquids such as lubricating oil or grease from a supply to a desired point such as a bearing, and delivering said liquid or semi-liquid at such point at a high pressure, for example, at pressures from six hundred to five thousand pounds per square inch.

Heretofore it has been the usual practice in lubricating automobiles, etc., to remove grease by hand from a drum or other supply container, place it in a grease gun or compressor, and carry or otherwise move the compressor to the bearing into which the grease is delivered by the compressor. In such handling, dirt or other foreign matter becomes mixed with the grease from the air or receptacles, manual labor is required, much time is consumed, and only relatively low pressures are attainable.

One object of the invention is to provide apparatus of this character wherein grease or the like can be withdrawn or pumped from a supply at atmospheric pressure, for example, from a drum, and supplied through a continuous conduit to a remote outlet nozzle at high pressure from which nozzle the grease can be directly applied to a bearing or other desired point with no possibility of contamination of the grease with dirt, etc., and with no manual handling, and in a minimum of time. In other words, the grease shall be transferred directly from the drum to the automobile bearing or the like automatically, quickly and at high pressure.

Another object is to provide an apparatus of the character described, embodying novel and improved features of construction whereby a steady, smooth and continuous flow of the lubricant under a uniform pressure is obtained at the outlet.

A further object is to provide such apparatus wherein the pressure of the lubricant at the nozzle may be easily controlled and varied within a large range, for example, from six hundred to five thousand pounds per square inch, so that the apparatus can be easily and quickly adjusted to accommodate various purposes for which it may be desired to use the apparatus.

Other objects are to provide high pressure lubricating apparatus so constructed and operated that no lubricant is lost in the transfer from the supply drum or the like to the bearing or other point where the lubricant is to be used; to provide such apparatus which may remain stationary and yet supply lubricant at high pressure to various remote points; to provide such apparatus including a pump and an accumulator device to which the lubricant is pumped and which has an outlet and means for ejecting the lubricant from said outlet in a steady continuous flow at uniform pressure, so as to avoid the jerky or spasmodic output common to high pressure lubricating systems now in use where the flow of lubricant consists of a plurality of spurts of jets corresponding to the number of pulsations of the pump and frequently jets of air caused by imperfect operation of the pump; and to obtain other advantages and results as will be brought out by the following description.

Referring to the accompanying drawings, in which corresponding and like parts are designated by the same reference characters:

Figure 2 is an enlarged vertical longitudinal sectional view through the barrel pump or the pump apparatus for withdrawing the lubricant from the supply drum or the like.

Figures 3 and 3A are complemental vertical longitudinal sectional views through the high pressure pumping apparatus and accumulator device, Figure 3A illustrating the apparatus broken away at the dot and dash lines of Figure 3.

Figure 1:
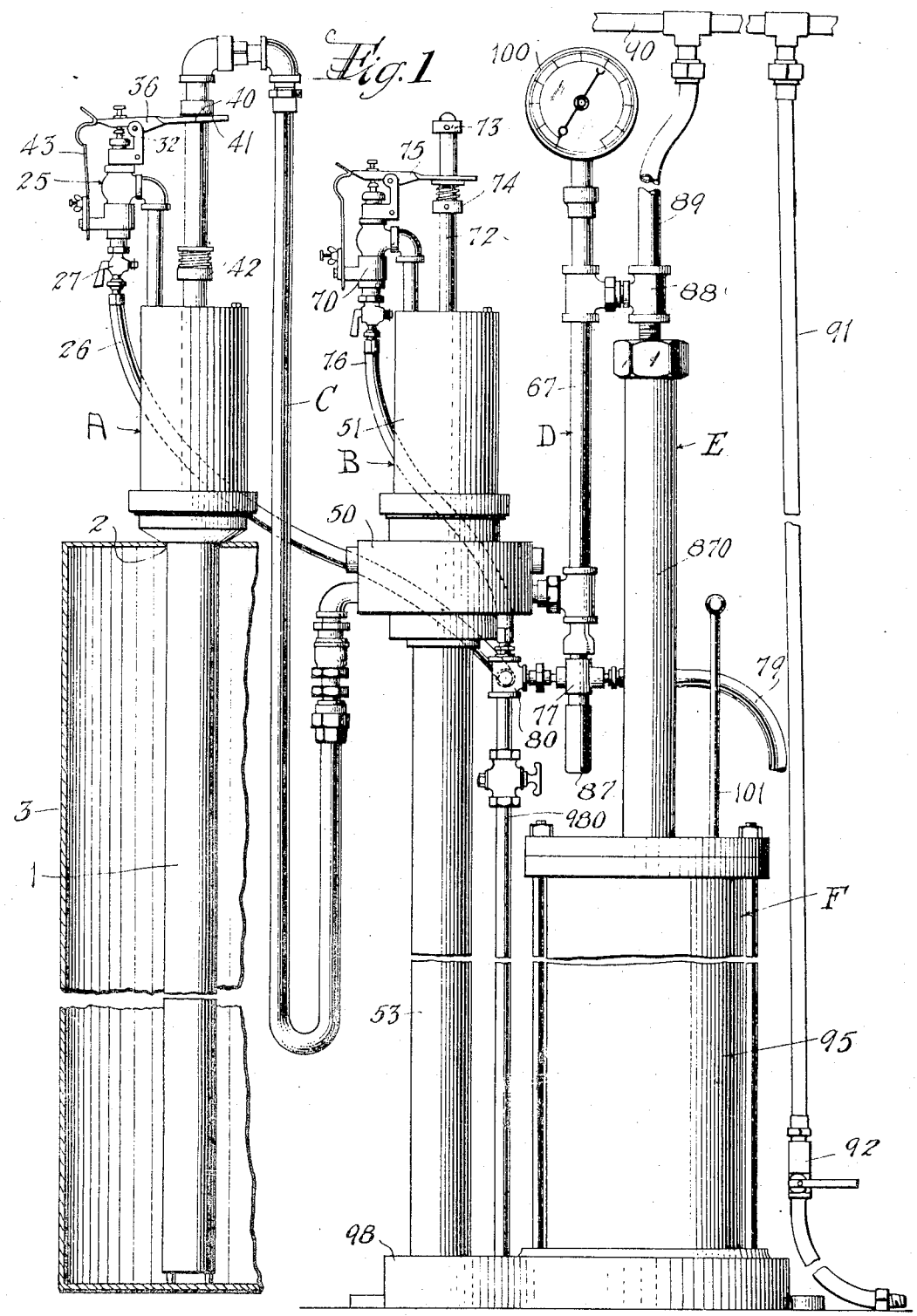
Figure 1 is a side elevation showing a high pressure lubricating apparatus embodying my invention.

Specifically describing the illustrated embodiment of the invention the reference character A generally designates the barrel pump mechanism, that is, the mechanism for withdrawing the lubricant or the like from a supply drum or other source; B designates the high pressure pumping mechanism, to which the lubricant is pumped through a hose or the like C, and which forces the lubricant through the pipe D to the accumulator device E in which the lubricant is maintained under high pressure by a compressed air cylinder and piston device F.

The barrel pump mechanism A comprises a pump cylinder 1 which is preferably of a size to be inserted through the usual plugged opening 2 into a supply drum 3 containing lubricant or other liquid or semi-liquid substance. At the lower end of the pump cylinder 1 is arranged a foot valve comprising a ball 4 cooperating with a seat 5 and held in proper relation to the seat by a cage 6. Preferably the lower end of the pump cylinder is also provided with legs 7 for maintaining the cylinder in spaced relation to the bottom of the drum 3. Within the cylinder is reciprocable a pump piston 8 which comprises a body portion 9 having an axial passage 10 therethrough in which is arranged a valve seat 11 with which cooperates a ball valve 12. One end of the body section 9 is reduced and screw-threaded at 13 and has threaded thereon a second body section 14 which clamps between itself and the body section 9 a pair of cupped packing rings 15. The body sections 9 serve as guides, while the cupped packing rings 15 maintain a liquid tight sliding fit of the piston with the cylinder. Connected to the upper end of the pump piston 8 is a combination piston rod and discharge tube 16 for reciprocating the piston and conducting the lubricant from the drum. A ball cage 17 is connected to the lower end of said tube to confine the ball valve 12 in proper cooperating relation with the seat 11.

The upper end of the pump cylinder 1 is connected to the lower end of a fluid pressure motor cylinder 18 in which is reciprocable a piston 19. This piston is connected to the pump plunger or piston rod 16 and also has connected thereto in axial alinement with said pump plunger an outlet tube and piston rod 20 which passes through a packed bearing 21 outwardly through the upper end of the motor cylinder 18. A compression spring 22 is interposed between the underside of the motor piston 19 and a spring housing tube 23 so as to normally influence the motor piston 19 and the pump piston 8 upwardly. The motor piston 19 is actuated in the opposite direction by fluid pressure which is admitted through a pipe 24 through a control valve 25 which is in general the same as described in my copending application Serial No. 200,532, filed June 22, 1928. Compressed air or other fluid pressure is admitted to the valve 25 through a tube 26 and cut-off valve 27. The valve 25 has a ball 28 arranged in its inlet passage 29 which is normally held against its seat by a compression spring 31. A valve stem tube 32 is slidably mounted through a gland 33 in the valve casing in substantially axial alinement with the ball 28 and is formed with a longitudinal passage 34 communicating with the atmosphere through a lateral passage 35. This stem has a limited relative movement with respect to the ball 28 and when said stem is pressed inwardly its inner end engages the ball to close the passages 34 and 35 and the pressure on the stem unseats the ball 28 to admit flow of fluid from the inlet 26 to the motor cylinder 18. When the stem 32 is released, the valve ball 28 is seated by its spring 31 and the pressure in the motor cylinder 18 raises the stem 32 from the ball to permit the fluid pressure in the motor cylinder to vent through the passages 34 and 35.

For operating the valve stem 32, I may utilize a trip lever 36 pivoted intermediate its end as at 37 upon a bracket 38 secured to the casing of the valve 25. One arm of said lever overlies the projecting end of the stem 32 and carries an adjustable set screw 39 to engage said stem. The other arm of the trip lever is bifurcated at 40 and embraces the projecting end of the outlet tube 20. A pair of spaced collars 41 and 42 are adjustably mounted on the outlet tube 20 at opposite sides of the bifurcated end 40 of the trip lever 36, so that as the motor piston 19 moves upwardly the lever 36 is moved by the collar 42 to force the valve stem 32 downwardly and open the ball valve 28, while on the downward stroke of the piston 19 the collar 41 moves the lever 36 in the other direction to release the valve stem 32.

Figure 2:
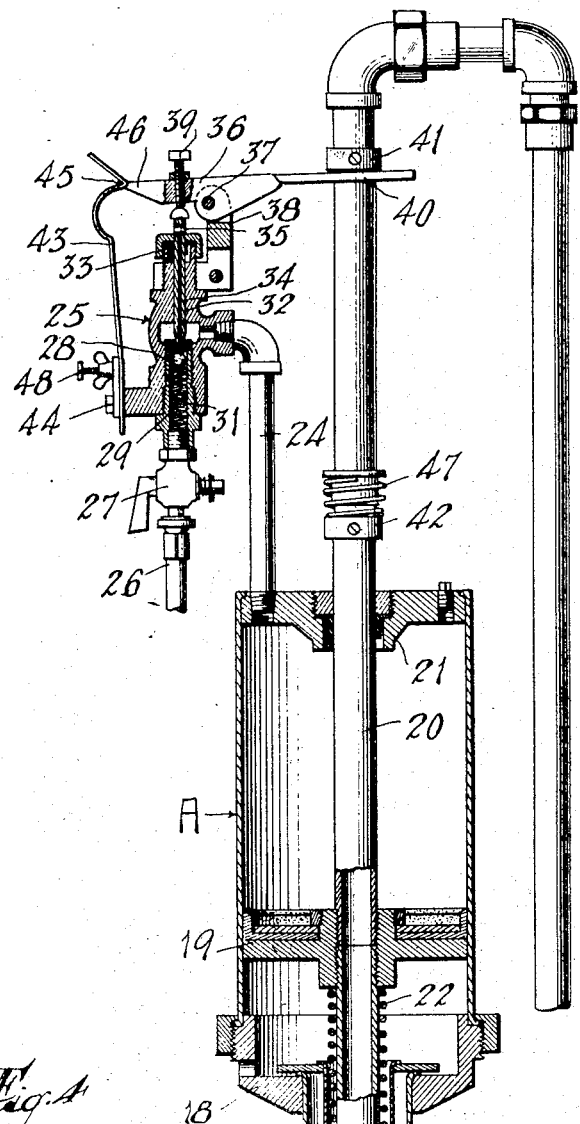

It is of course necessary to hold the valve ball 28 in open position for a certain period of time to permit the motor piston to move its full stroke, and for this purpose I may utilize a detent mechanism including a spring strip 43 having one end adjustably secured as at 44 to the valve casing, and its other end provided with a triangular shaped crimp 45 disposed in the path of movement of a similar shaped head 46 on the trip lever 36. As the motor piston 19 moves upwardly, it will be observed that the head 46 on the lever 36 will slide over the head or crimp 45 on the spring strip 43 until the apexes of the heads are in contact, the spring strip yielding outwardly. Further movement of the head 46 in the same direction will then permit the spring strip 43 to snap inwardly so that the crimp 45 overlies the head 46 and holds the lever 36 in the position to maintain the valve open, as shown, in Figure 2 of the drawings. Preferably a compression spring 47 is interposed between the collar 42 and the end 40 of the lever 36 to assist the action of the spring strip 43. As the piston 19 approaches the limit of its downward stroke the collar 41 engages the end 40 of the lever 36 so as to swing the head 46 upwardly relative to the crimp 45 and when the apexes of said heads and crimp pass each other, the spring strip 43 snaps inwardly and the lever 36 quickly moves so as to release the stem 32. The said stem is then raised by the pressure of the air in the motor cylinder 18 which vents through the passages 34 and 35, and the spring 22 returns the motor piston 19 to its upper limit. As the piston 19 is so returned, the collar 42 moves the lever 36 as above described so as to open the valve 28 at the upper limit of movement of the pistons. From the foregoing it will be understood that this action is automatic and that lubricant will be alternately drawn through the foot valve 4 of the pump from the drum, and ejected by the pump piston 8 through the pump valve 12 and the outlet tube 20. This action will continue until the pressure in the outlet tube 20 balances the pressure of air actuating the motor piston 19 and accordingly the lubricant in the outlet tube 20 will be constantly maintained at a uniform pressure. The tension of the spring strip 43 is adjustable by means of a set screw 48 so as to hold the lever 36 with the valve 28 in open position.

The motor piston 19 and pump piston 8 are of such relative sizes that with a fluid pressure of, for example, seventy-five to one hundred pounds acting upon the motor piston 17, the lubricant is ejected by the pump piston 8 through the outlet tube 20 at a pressure of, for example, six hundred pounds.

The outlet tube 20 is connected by the hose or the like C to the high pressure pump mechanism B. This mechanism includes a pump cylinder 49 which is preferably formed in a cylinder and valve block 50 which in turn forms one end of a fluid pressure motor cylinder 51. The block 50 has an inlet passage 52 to which is connected the hose or pipe C, and this passage leads to a compensator cylinder 53 in which is reciprocable a piston 54 normally influenced by a spring 55 against the pressure of the lubricant in the inlet passage 52. The inlet passage 52 communicates with a lateral duct 56 which leads to a valve chamber 57. This valve chamber extends transversely through the block 50 at substantially right angles to the pump cylinder 49 which communicates with the valve chamber substantially midway of the length of the latter. Within the valve chamber 57 at one side of the pump cylinder 49 is an inlet valve which comprises a body 58 slidably fitted within the chamber from one end and abutting against a shoulder 59. The valve body has connected to the outer end thereof a perforate spacing sleeve 60 against which is screwed a packing plug 61 for holding the valve body in position. Within the valve body is slidably mounted a valve comprising a tubular stem 62 and a head 63 which cooperates with a seat in the inner end of the valve body 58. The valve head is normally held against its seat by a compression spring 64. The valve stem has lateral ports 65 which establish communication between the passage through the stem and the interior of the valve body behind the valve head.

A substantially identical outlet valve 65 is provided in the valve chamber 57 at the other side of the pump cylinder 49. The only difference between this valve and the inlet valve is that the valve body is reversed and the spacing sleeve 60 is connected to the end of the valve body 58 opposite to that to which the spacing sleeve is connected in the inlet valve. An outlet duct 66 is provided in the block 50 and communicates through a pipe 67 with an accumulator device E. The inlet and outlet valves are interchangeable.

Within the pump cylinder 49 is reciprocable a pump piston 68 which is connected to a motor piston 69 reciprocable within the cylinder 51. Fluid under pressure is alternately supplied to and vented from the motor cylinder 51 by a valve 70 identical in construction with the valve 25 of the barrel pump mechanism, the motor piston being actuated in one direction by a compression spring 71. The piston 68 has a rod 72 projecting from the motor cylinder 51 and carrying collars 73 and 74 which cooperate with the valve actuating trip lever 75 in the identical manner in which the collars 40 and 42 actuate the trip lever 36 of the barrel pump mechanism.

In operation of the high pressure pump mechanism, the lubricant is supplied to the inlet passage 52 in a more or less pulsating manner common to pumps. This lubricant is forced into the compensator cylinder 53 against the piston and spring 54 and 55 until a quantity of lubricant under pressure of the the spring 55 has been stored up in the compensator. The lubricant then passes through the inlet valve 58 into the pump cylinder 49 the flow of lubricant being substantially uniform due to the constant and uniform pressure exerted by the piston and spring 54, 55. This compensates for the pulsating and irregular pumping action which may occur in the barrel pump mechanism A. The pump piston 68 is reciprocated downwardly under fluid pressure from the valve 70 and raises the pressure of the lubricant so as to force it through the outlet port 66 and into the accumulator device E under high pressure. The motor piston 69 has an area relatively greater than the area of the pump piston 68 so that the lubricant is ejected through the outlet valve 65 at a high pressure of, for example, five thousand pounds per square inch. The pressure of the fluid actuating motor piston 69 may be from seventy-five to one hundred pounds and supplied by a hose 76 from the same source which supplies the barrel pump mechanism.

For regulating the supply of air to the barrel pump motor 18, 19, and the high pressure pump motor 51, 69, I may provide a pressure governor valve which comprises a casing 77 having a lateral passage 78 to one end of which is connected the air supply hose 79 and to the other end of which is connected a T-fitting 80 to which in turn are connected the supply hoses 76 and 26 of the pumps 18, 19 and 51, 69. The flow of fluid through this lateral passage is controlled by a valve which includes a rod 81 reciprocable in an opening 82 extending through the casing 77 at right angles to the passage 78, said rod having a circumferential groove 83 arranged to register with the passage 78. One end 84 of this rod projects into the outlet pipe 67 while the other end 85 is engaged by a compression spring 86 the force of which is variable by an adjusting cap 87. The pressure of the lubricant in the outlet pipe 67 tends to move the valve rod 81 against the compression spring 86, or vice-versa, and movement of the valve rod varies the supply of air through the lateral passage 78 due to restriction of the lateral passage by movement of the circumferential groove into and out of register with the passage. For example, an increase in pressure of the lubricant would move the valve rod 81 downwardly against the spring 86 (see Figure 3) and thereby reduce or entirely cut off the flow of fluid through the passage 78, whereby the speed of the motors 18, 19 and 51, 69 would be reduced or the motors stopped.

The accumulator device E to which the lubricant under high pressure is supplied by the pump mechanism B includes a cylinder 870 connected to the outlet pipe 67 by a T-fitting 88 to which is also connected the main outlet pipe 89 which may in turn be connected to a manifold pipe 90 from which lubricant may be taken off at various points by a number of hoses 91, the discharge through which may be controlled by a cut-off valve 92 such as described in my copending application Serial No. 363,028, filed May 14, 1929. Within the cylinder 870 is slidable a packed piston 93 which is actuated against pressure of the incoming lubricant by a piston 94 reciprocable in the accumulator pressure cylinder 95, the accumulator piston 93 having a rocking connection 96 with the end of the piston rod 97 connected to the piston 94. The accumulator pressure mechanism F is preferably mounted on a base 98 to which also may be connected the compensator device 53 (see Figure 3A). Fluid under pressure is supplied to the cylinder 95 by a pipe 980 connected to a T-fitting 80 and leading through a duct 99 in the base 98 into the lower end of the cylinder. The supply of fluid pressure to the cylinder 95 is thus controlled by the pressure governor 77, and the air comes from the same source which supplies the pump motors 18, 19, and 51, 69. The area of the piston 94 is much greater than the area of the accumulator piston 93 so that the lubricant may be ejected through the outlet pipe 89 at a pressure of, for example, five thousand pounds with the piston 94 acted upon by fluid at a pressure of from seventy-five to one hundred pounds. The accumulator cylinder 870 permits a large quantity of lubricant to be stored therein and also causes the lubricant to be ejected into the outlet pipe 89 with a uniform and smooth flow at constant pressure, so as to compensate for or overcome the sometimes spasmodic or pulsating supply of lubricant flowing from the pump 49, 68. A pressure gauge 100 may be connected to the outlet pipe 89 to indicate the pressure of the lubricant being ejected.

Obviously the pressure of the lubricant in the manifold outlet pipe 90 may be varied through a wide range by simply adjusting the pressure governor spring 86 by rotation of the adjusting cap 87.

To indicate the amount of lubricant in the accumulator 870, I may utilize a rod 101 which rises and falls with the piston 94. The lubricant or other material can be directly supplied from a drum or other source to a remote point, for example through one of the take-off hoses 91, with no manual handling of the lubricant, without possibility of contamination thereof by contact with exterior objects or receptacles, without loss of a particle of the lubricant, in a minimum of time, and with a steady and constant flow at uniform high pressure.

Figure 5:
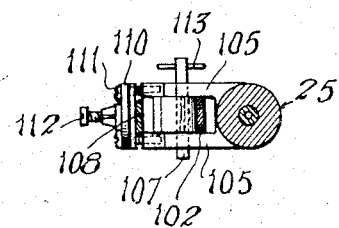
Figure 5 is a horizontal sectional view taken on the line 5—5 of Figure 4.
Figure 4:
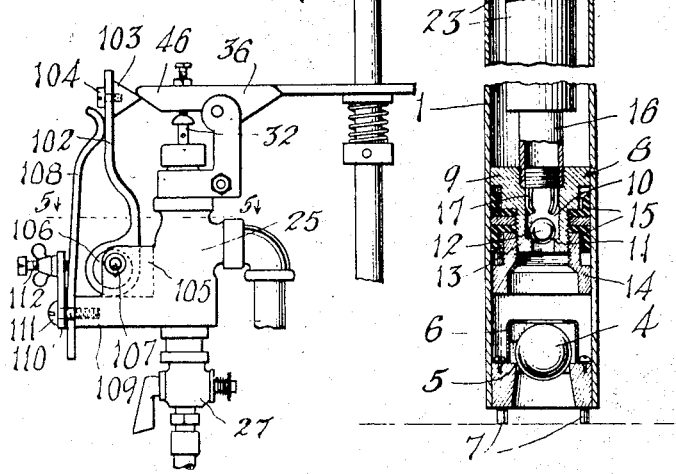
Figure 4 is a side elevation of one of the fluid pressure control valves showing a modified form of detent mechanism for holding the actuating lever in valve opening position.

In Figures 4 and 5 I have shown a modified form of detent mechanism for holding the valve actuating levers 36 and 75 in valve opening positions. As shown the mechanism comprises a rigid detent lever 102 having at one end a triangular shaped head 103 formed of hardened steel and detachably secured to the detent lever as by a screw 104. The other end of the detent lever is pivotally connected to a fixed support, as to the casing of the valve 25 or 70. Preferably the valve casing is provided with a pair of spaced integral ears 105 in which is journaled a pivot member 106 on an eccentric pivot shaft 107. The end of the detent lever is pivotally mounted on the pivot member 106 so as to oscillate thereupon into and out of the path of movement of the end 46 of the valve actuating lever. For actuating the detent lever so as to force the head 103 into the path of movement of the end 46 of the valve actuating lever, I may provide a leaf spring 108 which is removably secured to a boss 109 on the valve casing between the boss and a clamping plate 110 which is secured to the boss by screws 111. By loosening the screws 111 the spring 108 may be moved vertically to vary the point of contact thereof with the detent lever 102. The clamping plate 110 has mounted therein an adjustable screw 112 bearing upon the spring 108 so as to vary the pressure exerted by the spring on the detent lever.

Obviously by rotating the pivot member 106 upon its shaft 107 as by means of a handle 113, the head 103 of the detent lever may be adjusted with respect to the beveled surfaces at the end 46 of the valve actuating lever, the adjustment being accomplished by longitudinal movement of the detent lever caused by the eccentric mounting of the pivot member 106. This may be found more advantageous than the adjustment of the spring strip 43 shown in Figure 2 of the drawings. Furthermore this construction has the advantage that the relation of the head 103 with respect to the beveled surfaces of the valve actuating lever, does not vary as might be the case in the spring strip 43 by straightening of the head portion 45.

While I have shown and described the invention as embodied in certain details of construction, it will be understood that this is primarily for the purpose of illustrating the principles of the invention which may be widely applied in many different forms of apparatus without departing from the spirit or scope of the invention.

Having thus described my invention, what I claim is:

1. Pressure lubricating apparatus comprising a pump including a block having a cylinder therein, a pump piston reciprocable in said cylinder, means for operating the pump piston, a valve chamber in said block at right angles to the axis of said cylinder having each end closed by a removable plug and having an inlet port at one side of said cylinder and an outlet at the other side, said chamber also having an outwardly facing shoulder between said cylinder and each end, inlet and outlet check-valves each including a tubular body arranged between one of said shoulders and the respective inlet and outlet port and having a valve seat at one end, spring closed valve heads arranged to cooperate with said valve seats, and a perforate spacing sleeve removably connected to each valve body and in abutting relation to said plugs so that said valve bodies are clamped between said shoulders and said plugs and are removable from said valve chamber through the respective ends thereof when said plugs are removed.

2. Pressure greasing apparatus comprising a pump having an outlet and an inlet to receive lubricant from a source, raise the pressure of the lubricant and eject it through said outlet, and a lubricant accumulator including a cylinder to receive said lubricant from said pump and having an outlet, a piston in said cylinder for ejecting said lubricant, a second cylinder, a piston in said second cylinder connected to the first-mentioned piston, and means for supplying fluid under pressure to said second cylinder to actuate said pistons and eject said lubricant from said accumulator cylinder, said first-mentioned and second cylinders and pistons and said fluid pressure being in such ratio to each other and the pressure of the grease from said pump that the pressure exerted on the grease in said accumulator cylinder substantially equals the pressure of grease from said pump.

3. Pressure greasing apparatus comprising a pump having an outlet and an inlet connected to a supply of lubricant for withdrawing lubricant from said source and ejecting the lubricant through said outlet, a second pump having an outlet and an inlet connected to said outlet of the first pump to receive lubricant from the first pump, raise the pressure of the lubricant and eject it through said outlet, and a lubricant accumulator including a cylinder to receive said lubricant from the second pump and having an outlet and means for ejecting the lubricant from said accumulator cylinder under substantially the same pressure at which the lubricant is supplied by said second pump to the accumulator cylinder, motor-operated mechanism for driving each of said pumps, and governor means actuated by the pressure of lubricant in said outlet of the second pump for controlling operation of said motor-operated mechanisms.

4. Pressure greasing apparatus comprising a pump having an outlet and an inlet connected to a supply of lubricant for withdrawing lubricant from said source and ejecting the lubricant through said outlet, a second pump having an outlet and an inlet connected to said outlet of the first pump to receive lubricant from the first pump, raise the pressure of the lubricant and eject it through said outlet, and a lubricant accumulator including a cylinder to receive said lubricant from the second pump and having an outlet and means for ejecting the lubricant from said accumulator cylinder under substantially the same pressure at which the lubricant is supplied by said second pump to the accumulator cylinder, a fluid pressure motor for driving each of said pumps, an automatic valve for regulating operation of each pump, and a governor valve actuated by the pressure of the lubricant in said outlet of the second pump for controlling the supply of fluid to said automatic valves.

5. The apparatus set forth in claim 2 with the addition of fluid pressure operated means for actuating said pump, and governor means actuated by pressure of the grease in said pump outlet for controlling supply of fluid pressure to said pump operating means and said second cylinder of said lubricant accumulator.

6. In apparatus for distributing grease, the combination with a container for grease, of a pump including a cylinder removably inserted into the grease in said container and having an inlet and an outlet, a piston in said cylinder, a compensator including a cylinder to receive grease from said outlet and means for constantly influencing grease from said compensator cylinder, a motor for said pump mounted on said pump cylinder above said container, a second pump having an outlet and an inlet connected to said compensator cylinder, said second pump being constructed to raise the pressure of said grease and eject it through the outlet of the second pump, a motor for the second pump, and means actuated by the pressure of the grease at the outlet of said second pump for controlling both said motors.

7. Pressure grease distributing apparatus comprising a conduit for supplying grease from a source to a remote point, a plurality of devices connected in said conduit, one having an inlet connected to said source and an outlet, and another device having an inlet connected to said outlet of the first device and an outlet connected to the inlet of the next successive device, each device being constructed to raise the pressure of the grease received from the next preceding device and force it through said conduit to the next succeeding device, a motor for operating each of said devices, and means controlling all of said motors and actuated by the pressure of the grease at the outlet of the last device.

8. Pressure greasing apparatus comprising a pump having an outlet and an inlet connected to a supply of lubricant for withdrawing lubricant from said source and ejecting the lubricant through said outlet, a compensator including a cylinder to receive lubricant from said outlet and means constantly influencing said lubricant from said cylinder under pressure, a second pump having an outlet and an inlet connected to both said outlets of the first pump and said compensator so as to receive the lubricant from both thereof, said second pump to raise the pressure of the lubricant and eject it through the outlet of the second pump, and a lubricant accumulator including a cylinder to receive said lubricant from the second pump and having an outlet and a piston actuated by fluid pressure for ejecting the lubricant from said accumulator cylinder under substantially the same pressure at which the lubricant is supplied by said second pump to the accumulator cylinder, a fluid pressure motor for actuating each of said pumps, a common source of fluid under pressure, and a governor valve actuated by the lubricant pressure in said outlet of the second pump for controlling the supply of fluid to said motors.

JOSEPH W. WOODRUFF.